Aug. 15, 1961 D. A. WITT 2,996,607
DOME LIGHT
Filed Oct. 15, 1959 3 Sheets-Sheet 1
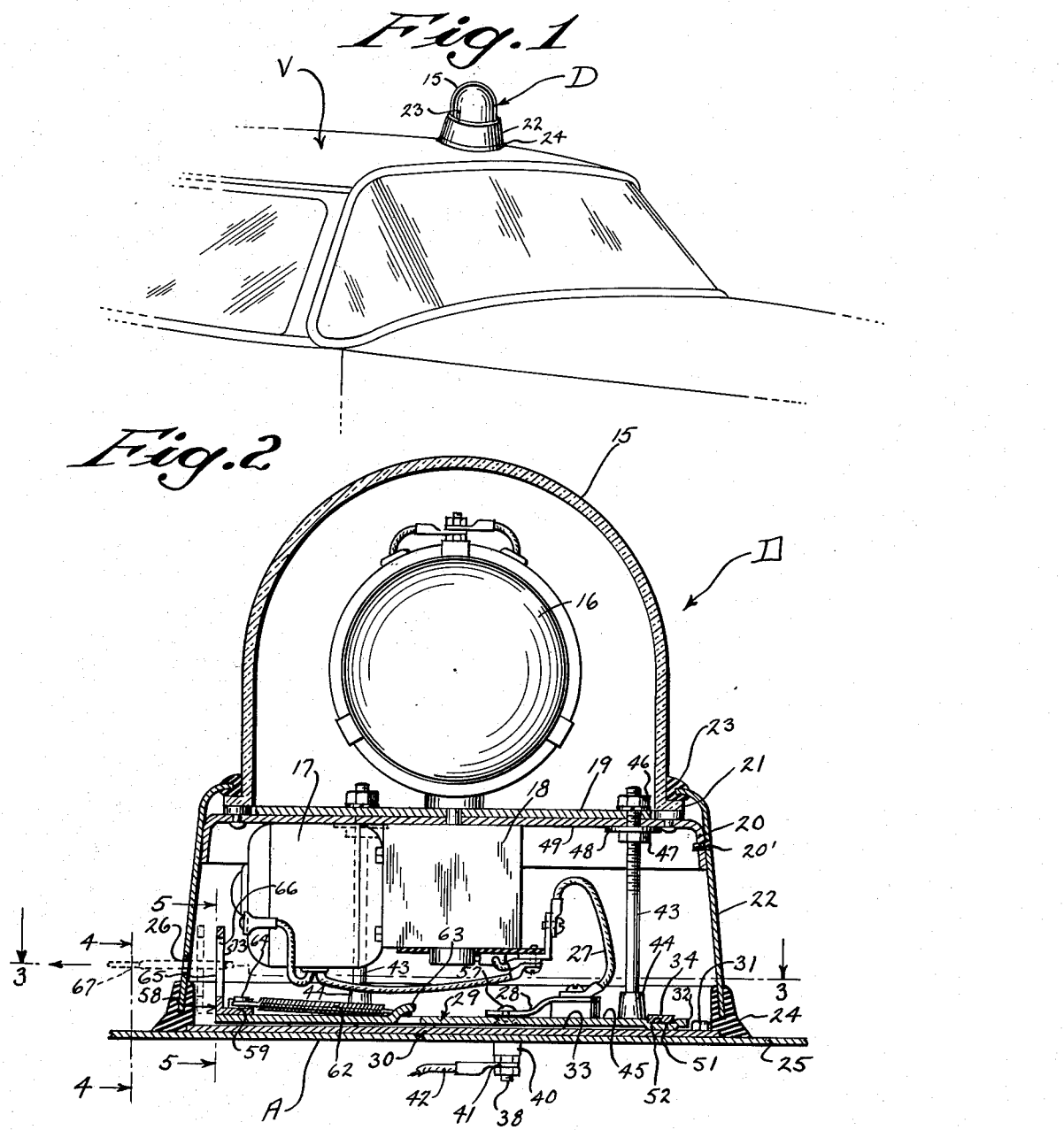
INVENTOR
DONALD A. WITT
BY
Wright & Wright
ATTORNEYS Aug. 15, 1961

D. A. WITT 2,996,607

DOME LIGHT

Filed Oct. 15, 1959

INVENTOR
DONALD A. WITT

BY
Wright and Wright

ATTORNEYS

Aug. 15, 1961  D. A. WITT  2,996,607
DOME LIGHT
Filed Oct. 15, 1959  3 Sheets-Sheet 3
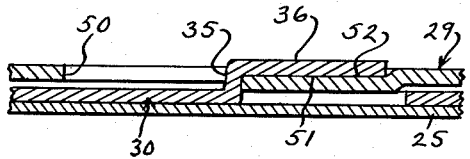
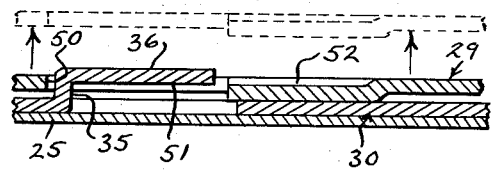
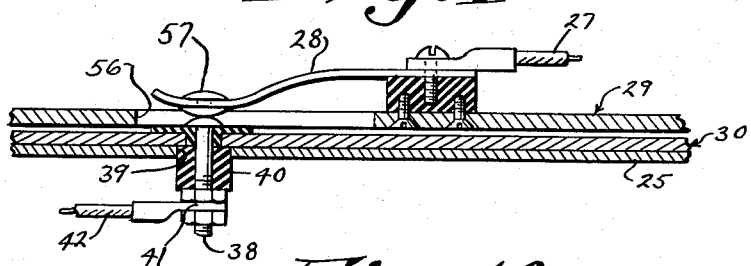
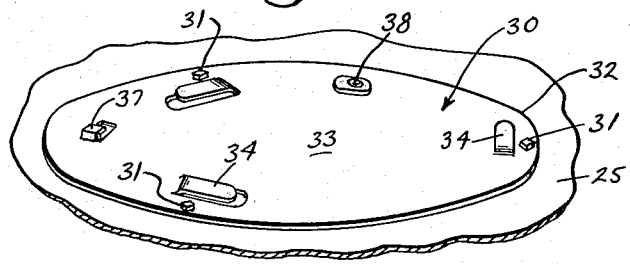
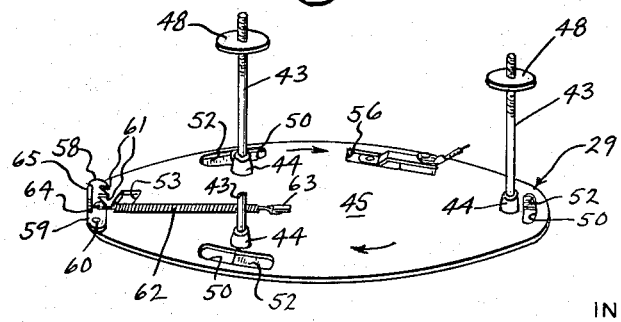
INVENTOR
DONALD A. WITT
BY
*Wright & Wright*
ATTORNEYS United States Patent Office 2,996,607
Patented Aug. 15, 1961

2,996,607
DOME LIGHT
Donald A. Witt, Rte. 1, Crivitz, Wis.
Filed Oct. 15, 1959, Ser. No. 846,739
3 Claims. (Cl. 240—7.1)

This invention relates primarily to dome lights for emergency vehicles, and more particularly to a new and improved dome light and adapter.

Most emergency vehicles, and in particular those utilized by law enforcement officers, usually carry an emergency dome light which is centered on the roof of the vehicle adjacent the forward end thereof. This light usually is a rotating, flashing type, and of course, serves the purpose of warning others of the approach of the emergency vehicle. However, particularly in law enforcement, it is desirable at times that the law enforcement vehicle approach unnoticed and that the vehicle itself be unmarked. As a result of this, most law enforcement agencies keep a certain set of vehicles which do not have the emergency light and which are unmarked, and where it becomes necessary from the expense standpoint to utilize the same vehicle for two purposes, difficulty is encountered. This is due to the fact that the dome light can be readily observed and the approach of the emergency vehicle or law enforcement parties is readily ascertained. Some law enforcement agencies have gone to detachable types of dome lights, but to my knowledge, there is no practical and dependable, detachable emergency dome light on the market. I do know of one type which utilizes permanent magnets, but due to the vibration of the vehicle it has been found that this type of light tends to travel or move about and thus is generally undesirable.

Therefore, it is a primary object of my invention to provide an emergency dome light for vehicles which can be readily attached and detached and which when attached is firmly secured to the vehicle.

Another important object is to provide a novel lock and latch mechanism for my dome light so that when the same is in place on the vehicle it cannot be readily removed by unauthorized personnel, and will be positively locked and secured to the vehicle.

Another object of my present invention is to provide a dome light adapter for detachably connecting the dome light to the vehicle, consisting of two relatively flat, round interlocking plates, the lower plate being secured to a section of the car roof and the upper plate being secured and closing the bottom portion of the emergency dome light.

A salient feature of my invention resides in the fact that when the dome light is removed from the vehicle, the lower plate which remains with the vehicle lies substantially flat with the roof or dome of the car and thereby is not readily observable.

A more specific object of my present invention is to provide an adapter for an emergency dome light, in which the lower plate is provided with spaced fingers, the upper portions of which are spaced from, but extend substantially parallel with the upper surface of the plate, and providing the upper plate with spaced slots with which the fingers are aligned and into which they may extend so that by a rotating movement of the upper plate, the fingers will overlie the upper surface of said plate and thereby hold the plates together.

Still another object of my invention is to provide a stop and catch piece on said lower plate and a spring held toothed latch on said upper plate which engages the stop to interlock and hold the two plates against rotation when they are joined or interlocked and to also provide both plates with novel means for supplying electrical current to the motor and light.

A further object of my invention is to contain my novel lock mechanism entirely within the housing of the light so that when the dome light is secured in place, the lock mechanism cannot be reached, operated or released from the outside, without using my specific type of key instrument.

A still further object of my invention is to provide a simple, practical and reliable construction that is economical to manufacture, easy to assemble and positive in its operation.

With the above and other objects in view, which will more readily appear as the nature of the invention is better understood, the same consists in the novel construction, combination and arrangement of parts, hereinafter more fully described, illustrated and claimed.

A preferred and practical embodiment of my invention is shown in the accompanying drawings, in which FIGURE 1 is a fragmentary perspective view showing my novel dome light secured in its operative position on the roof or dome of an automotive vehicle;

FIGURE 2 is an enlarged vertical sectional view through the light and adapter showing details in its construction;

FIGURE 7 is an enlarged vertical section taken through the interlocking upper and lower plates, the plates being shown in their closed position and the section represented by the line 7—7 of FIG. 3 of the drawings and looking in the direction of the arrows;

FIGURE 8 is a view similar to FIGURE 7 of the drawings but showing the plates in their unlocked position so that the upper plate may be moved in the direction of the arrows to its released dotted line position;

FIGURE 9 is a fragmentary vertical section taken on the line 9—9 of FIGURE 3 of the drawings, looking in the direction of the arrows and illustrating my novel means for supplying electrical current to the light and motor;

FIGURE 10 is a reduced top plan view in perspective of the lower plate shown secured to a section of the vehicle roof, and FIGURE 11 is a reduced perspective view showing the upper plate prior to being secured to the dome light.

Figure 3:
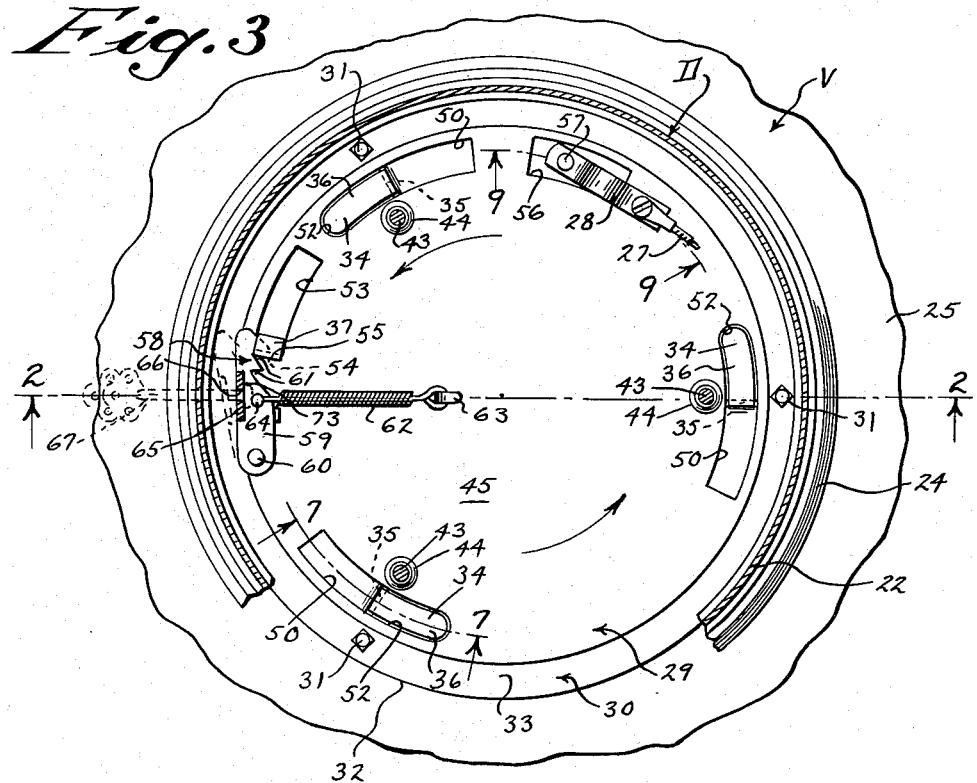
FIGURE 3 is a horizontal sectional view taken on the line 3—3 of FIGURE 2 of the drawings, looking in the direction of the arrows, certain parts of the view being broken away to illustrate details of construction, and showing my novel latch mechanism in its locked position in full lines, and in its open or unlocked position in dotted lines.

Referring now to the drawings, wherein similar reference characters designate corresponding parts throughout the several views, the letter D generally indicates my novel dome light and the same is shown in its operative position in FIG. 1 of the drawings on the vehicle V. The dome light D is generally of a standard construction and is of the same type of light as that now manufactured by the Federal Sign and Signal Corp. under the trade name "Beacon Ray," and therefore, need not be described in detail; however, for purposes of clarity, the dome light D consists of an upper translucent red bell-shaped portion 15 inside of which is positioned a rotating light structure 16. The light 16 is rotated by a motor 17 and a gear reducing mechanism 18. This mechanism is secured to the under portion of a pair of joined floor plates 19, and one of the plates is provided with a depending peripheral flange 20. It should be noted that the lower portion of the bell-shaped glass housing 15 is also provided with a peripheral flange 21 and over this mechanism a skirt-like housing 22 is slipped. This skirt-like housing 22 is provided with an upper insulated rubber grommet 23 which engages the flange 21 of the glass portion and a lower sealing rubber ring 24 which lies flat with the roof 25 of the vehicle V. This housing 22 is secured to flange 20 by screws 20' and in the usual construction the roof 25 of the vehicle is provided with three or more openings for headed bolts, which bolts extend into the joined plates 19 to firmly secure the light to the roof 25.

Thus far, the portions of the dome light described are as stated above, standard, and it should be readily apparent that time and effort would be required to remove the dome light, as it would be necessary to practically disassemble the light before the same could be removed from the vehicle.

Figure 4:
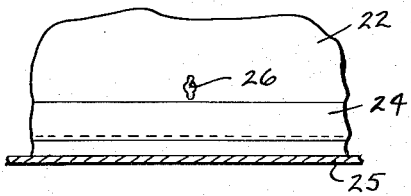
FIGURE 4 is a fragmentary side elevational view of a portion of the skirt or housing of the light, and illustrating the opening provided for my novel key or instrument utilized in releasing the latch, the view being represented by the line 4—4 of FIGURE 2 of the drawings, looking in the direction of the arrows.
Figure 5:
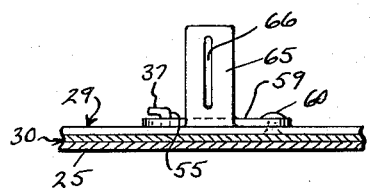
FIGURE 5 is a fragmentary vertical section taken on the line 5—5 of FIGURE 2 of the drawings, looking in the direction of the arrows, and illustrating further details in my novel latch mechanism.
Figure 6:
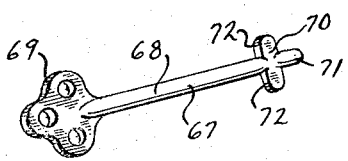
FIGURE 6 is a perspective view of the key or instrument utilized to move the latch from its locked to its unlocked position.

My invention therefore modifies and improves the dome light structure D and provides a novel adapter arrangement A so that a mere rotation of the dome light D in one direction will release the entire light from the roof 25 of the vehicle and a rotation in the opposite direction will securely lock and hold the light to the roof of the vehicle V. Further, this is accomplished by only a very slight modification in the dome light structure, one being the provision of a novel opening 26 (FIG. 4 of the drawings) provided in the skirt 22 of the light, and the other being in providing a short connector wire 27, terminating in a wiper arm 28.

Therefore, my novel adapter A comprises broadly a pair of interlocking round plates 29 and 30 respectively. The upper plate 29 being secured to and closing the bottom portion of the dome light D and the lower plate 30 being bolted by means of metal screws 31 and the like to the roof 25 of the vehicle V.

The lower plate 30 is preferably stamped from a flat piece of thin gauged metal and is circular in form and of a slightly greater circumference than the circumference of the upper plate 29. The reason for this is that when two plates are interlocked, as will be later described in detail, the upper plate should lie substantially flat with the lower plate and must clear the headed metal screws 31. Therefore, for this purpose, it should be noted that the metal screws 31 are secured adjacent the outer periphery 32 of the lower plate 30 and that the outer periphery of the upper plate 29 is reduced to clear the metal screws 31.

Struck up from the surface 33 of the plate 30 is a series of raised fingers 34. These fingers may be of any desired number but in the preferred form, I provide three spaced fingers, and referring more particularly to FIGURES 7 and 8 of the drawings, it can be seen that each finger includes a short upwardly extending vertical portion 35 of a sufficient length to space the horizontally disposed portion 36 sufficiently above the upper surface 33 of the plate, so that a portion of the upper plate can be received between the finger 34 and the roof 25. Also provided is a stop latch piece 37. All of these projections are spaced about and adjacent the outer periphery of the plate, but inward of the fastening screws 31. I also provide an insulated contact button 38. It should be here noted that the only openings made in the roof 25 of the vehicle would be those openings made by the metal screws 31 and one opening 39 (see FIG. 9 of the drawings), through which a rubber insulating grommet or the like 40 extends. This grommet 40 insulates the metal conductor button 38 which is provided with the usual electrical connection 41 for connecting the wire 42 leading to a source for electrical energy. Thus, it can be seen that the lower plate 30 is firmly attached to the roof of the vehicle with relatively little damage or changes. Further, this plate 30 lies substantially flush with the roof and cannot be readily observed for any appreciable distance. From this standpoint, the vehicle may have the appearance of any ordinary car and its identity as a law enforcement vehicle cannot be ascertained.

The upper plate 29 is firmly secured to the dome light D by means of three upstanding bolts 43. These bolts are similar to the standard bolts which usually extend through the roof of the vehicle, but I weld or otherwise secure the heads 44 of each bolt to the flat upper surface 45 of the plate 29 (note FIG. 11), and then these bolts pass through the floor plates 19 (FIG. 2), and the nuts 46 and 47, respectively, are tightened so that the light D is secured to the plate. Furthermore, a novel feature in this manner of securing the plate 29 to the dome light resides in the fact that just above the lower nuts 47, I provide each bolt with a relatively wide washer 48, upon which the lower surface 49 of the floor plates 19 rest. Now, should the roof 25 of the vehicle be uneven or curved, it should be readily apparent that by turning each respective nut 47, each washer 48 respectively can be adjusted as to height and thereby center the light in a substantially vertical position and when the floor plates 19 come to rest on the washers 48 they will then be in substantially horizontal position. Obviously, once this adjustment is made, it need not be tampered with, as then the plate 29 is firmly secured and becomes an integral part of the dome light D.

The upper plate 29 is then provided with spaced arcuate slots 50 which are in alignment with the finger 34 of the lower plate 30, and are of a size and configuration to readily receive the fingers therethrough.

It should be obvious, from the foregoing, that by merely placing the aligned slots 50 over the fingers 34, and lowering the upper plate 29 so that the fingers will extend through the slots and then rotating the upper plate 29 in the direction of the arrows, FIG. 11, that the lower surface 51 of each finger will overlie the upper surface 45 of the upper plate 29 and hold the two plates together. However, in order to assure that each plate will lie in a substantially flushed position throughout the entire surfaces when locked, I provide a dished-out portion 52 adjacent each slot 50 which just receives and engages the horizontal portion 36 of the fingers 34, thus giving a snug, interlocking engagement.

I also provide an arcuate slot 53 which is in alignment with the stop piece 37 of the lower plate 30 and is of a size and configuration so that when the plates are in their interlocked position, FIGURE 3, the vertical portion 54 of the stop 37 will just abut or touch the end 55 of the slot 53. With this in mind, a slot 56 is formed in the upper plate 29 adjacent the wiper arm 28 and this slot receives the contact button 57 so arranged that when the plates are in their interlocked position contact button 57 of the wiper arm 28 will rest on the contact button 38, which is secured to the lower plate 30 and extends through the roof 25. Thus, electrical energy is supplied to the motor and light.

In order to insure the plates from being accidentally unlocked when in a locked position, and mainly to prevent unauthorized personnel from rotating and turning the dome light, I provide a novel lock and latch mechanism 58, and this mechanism 58 includes the upstanding stop member 37 and a pivoted spring urged latch 59. This latch 59 in its normal position tends to overlie the slot 53 and when the two plates are interlocked will engage the stop member 37. This latch is pivoted to the outer periphery of the plate 29 by means of a pivot pin 60, at one end and its opposite inner end is provided with a series of teeth 61 one of which will engage the stop 37, as shown in FIG. 3 of the drawings, thus preventing relative rotation of the plate. The spring 62 is secured at one end 63 to the plate 29, and at the other end 64 to the latch and continually urges the latch towards its locked position, as previously described. In order to move the latch 58 from its locked position to its unlocked position, shown by the dotted lines in FIGS. 2 and 3, and by full lines in FIG. 11, I provide the latch 58 with an upstanding vertical member 65 formed integral therewith, and being provided with an elongated vertically extending slot 66.

I also provide a key-like instrument 67 having a long shank 68, an end 69 which may be readily grasped in the fingers, and a cross-piece 70 at the end opposite the fingerpiece, so that in one position the cross-piece 70 and end 71 will extend through the shaped openings 26 of the skirt 22 and into the slot 66 of the vertical member 65. Then the key is rotated so that the edges 72 of the cross-piece 70 will engage the inner surface 73 of the piece 65, and by pulling on the key-like instrument the latch 58 will be pivoted from its full line position to its dotted line position, thus releasing the stop 37. The plate 29 is now free to be turned in the direction of the arrows, FIG. 3, and the dome light may be removed, as indicated by FIG. 8 of the drawings.

Thus, it can be seen that I have provided an attachable and detachable emergency dome light, which is adjustable and adaptable to any surface and which in its locked position is firmly secured to the roof of the vehicle and cannot be readily removed by unauthorized personnel, but which can be quickly and easily removed by authorized personnel, and which when removed by authorized personnel does not leave any unsightly or obvious obstructions on the roof of the vehicle.

From the foregoing, it is believed that the features and advantages of my invention will be readily apparent to those skilled in the art and it will, of course, be understood that changes in the form, proportion and minor details of construction may be resorted to without departing from the spirit of the invention or the scope of the claims.

I claim:

1. A detachable dome light structure for use on the top of a motor vehicle comprising an outer circular housing, a rotary light, a motor and gears for rotating said light supported in said housing, an electrical circuit for said motor and light, an upper plate secured to said housing adjacent the bottom thereof, said plate having a series of arcuate slots spaced about its outer periphery, a flexible wiper arm secured to said plate terminating in a contact button, said wiper arm forming part of said electrical circuit, a slot in said plate adjacent said contact button, a latch member pivotedly secured adjacent the outer periphery of said plate and resiliently urged toward the inner portion of said plate, a slot adjacent said latch member, a lower plate detachably secured to said upper plate including a series of raised horizontally extending fingers in alignment with said slots in said upper plate, a contact button connected to a source of electrical energy secured to said lower plate in alignment with said slot adjacent the contact button of said upper plate and a raised lip in alignment with said slot adjacent said latch member in said upper plate, said lower plate adapted to be secured to the top of an automotive vehicle and said plates in one position being rotated and secured one to the other and in another position being rotated and detached one from the other.

2. A dome light structure as set forth in claim 1, wherein said lower plate is of a larger circumference than said upper plate.

3. A detachable dome light for use on the top of a motor vehicle comprising an outer housing, a light in said housing, an electrical circuit for said light supported in said housing, an upper plate secured to said housing adjacent the bottom thereof, said plate having a series of arcuate slots spaced about its outer periphery, a flexible wiper arm secured to said plate terminating in a contact button, said wiper arm forming part of said electrical circuit, a slot in said plate adjacent said contact button, a latch member pivotedly secured adjacent the outer periphery of said plate and resiliently urged toward the inner portion of said plate, a slot adjacent said latch member, a lower plate detachably secured to said upper plate including a series of raised horizontally extending fingers in alignment with said slots in said upper plate, a contact button connected to a source of electrical energy secured to said lower plate in alignment with said slot adjacent the contact button on said upper plate and a raised lip in alignment with said slot adjacent said latch member in said upper plate, said lower plate adapted to be secured to the top of an automotive vehicle, and said plates in one position being rotated and secured one to the other and in another position being rotated and detached one from the other.

References Cited in the file of this patent

UNITED STATES PATENTS

| | | |
|---|---|---|
| 1,495,778 | Butzke | May 27, 1924 |
| 2,578,239 | Gosswiller | Dec. 11, 1951 |
| 2,688,688 | Holtz | Sept. 7, 1954 |
| 2,825,799 | Julien | Mar. 4, 1958 |
| 2,853,595 | Baldwin | Sept. 23, 1958 |
| 2,922,875 | Buck | Jan. 26, 1960 |